United States Patent [19]

Kokubu

[11] Patent Number: 4,742,712

[45] Date of Patent: May 10, 1988

[54] SYSTEM FOR MONITORING AIR PRESSURE OF MOTOR VEHICLE

[75] Inventor: Sadao Kokubu, Aichi, Japan

[73] Assignee: Kabushiki Kaisha Tokai Rika Denki Seisakusho, Aichi, Japan

[21] Appl. No.: 28,182

[22] Filed: Mar. 19, 1987

[30] Foreign Application Priority Data

| Mar. 20, 1986 [JP] | Japan | 61-62827 |
| Nov. 20, 1986 [JP] | Japan | 61-179045[U] |
| Nov. 28, 1986 [JP] | Japan | 61-183971[U] |
| Nov. 28, 1986 [JP] | Japan | 61-183970[U] |

[51] Int. Cl.⁴ .......................................... B60C 23/02
[52] U.S. Cl. ..................................... 73/146.5; 340/58
[58] Field of Search ............... 73/146.5, 146.2, 146.8; 340/58

[56] References Cited

U.S. PATENT DOCUMENTS

4,384,482 5/1983 Snyder ........................ 73/146.5
4,532,493 7/1985 Sibeud ........................ 340/58

Primary Examiner—Donald O. Woodiel
Attorney, Agent, or Firm—Finnegan, Henderson, Farabow, Garrett & Dunner

[57] ABSTRACT

A system for monitoring air pressure of a vehicle tire is disclosed which comprises; a pressure switch provided on a tire wheel side, the pressure switch being turned on when the air pressure of the vehicle tire assigned to said pressure switch becomes lower than a predetermined value; a vibration producing device for producing vibration at a predetermined natural frequency when the pressure switch is turned on, the vibration thus produced being transmitted to an axle shaft supporting said tire wheel; and a vibration detecting for detecting the vibration. The vibration detecting means is provided on the axle shaft side.

8 Claims, 7 Drawing Sheets

SYSTEM FOR MONITORING AIR PRESSURE OF MOTOR VEHICLE

BACKGROUND OF THE INVENTION

This invention relates to a system for monitoring an air pressure of a vehicle tire with which the operator in a vehicle can monitor the air pressures of the tires even during traveling of the vehicle.

If a motor vehicle runs continuously for a long time with the tires considerably low in air pressure, the temperature of the tires may increased.

In order to overcome this difficulty, it is necessary to monitor the air pressures of the tires during traveling of the vehicle. However, since the tires are rotated at high speed during traveling of the vehicle, special means must be provided. For this purpose, the following air pressure monitoring means has been proposed according to the prior art: A pressure sensor which operates when the air pressure of a tire becomes lower than a predetermined value, and a transmitter for transmitting a radio wave signal in response to the operation of the pressure sensor are provided on the tire wheel side; while a receiver for receiving the radio wave signal, and an alarm unit for notifying the operator in response to the reception of the signal that the tire air pressure has been decreased.

The above-mentioned conventional air pressure monitoring means is disadvantageous in that it is necessary to employ the transmitter and the receiver which are expensive and relatively undurable against vibration. Furthermore, the operation of the air pressure monitoring means may be affected by spark noises or by electrical noises from radio equipment on other vehicles.

If the same air pressure monitoring means is installed on another vehicle, than the radio wave signals from the air pressure monitoring means of the two vehicles may interfere with each other.

On the other hand, of a plurality of tires of a vehicle, one whose air pressure has decreased can be located by differently coding the radio wave signals transmitted by the different transmitters. However, in the case where the tires are relocated for so-called "tire rotation", the coded signals must be changed. This coded signal changing operation is rather troublesome, which lowers the practicability of the method.

Furthermore, in the conventional air pressure monitoring means, the battery provided on the load wheel side is limited in capacity; that is, its service life is relatively short, and therefore the battery must be frequently replaced.

SUMMARY OF THE INVENTION

Accordingly, an object of this invention is to provide a system for monitoring an air pressure of a vehicle tire with which the air pressures of the tires of a vehicle can be monitored with high reliability even during traveling of the vehicle, and which can be manufactured at low cost.

In the system for monitoring an air pressure of a vehicle tire according to the invention, provided on the tire wheel side are a pressure switch which is turned on when the air pressure of the respective tire becomes lower than a predetermined value, and a vibration producing device which vibrates at a predetermined natural frequency when the pressure switch is turned on, the vibration being transmitted to an axle shaft supporting the tire wheel, and provided on the axle shaft side is a vibration detecting device for detecting the natural vibration of the vibration producing device.

When the air pressure of the tire becomes lower than the predetermined value, the predetermined natural vibration of the vibration producing device provided on the tire wheel side is transmitted through the axle shaft and detecting by the vibration detecting device provided on the axle shaft side, so that the decrease of the air pressure can be detected. Accordingly, the air pressure detecting system, unlike the conventional one, is not affected by electrical noises or by the similar systems installed on other vehicles.

According to another aspect of the invention there is provided a system for detecting an air pressure of a vehicle tire, which comprises: a transmitter unit including: a power source; an oscillating circuit for carrying out oscillation in response to a detection signal outputted by a pressure sensor which is so arranged as to detect an air pressure of a vehicle tire; and a vibrator excited by the output of the oscillating circuit; and an attachment selected according to the configuration of a tire hub, to connect the tire hub to the transmitter hub, the natural vibration of the vibrator thus excited being transmitted through the attachment and the tire hub to the vehicle body side; and a vibration detecting device provided on the vehicle body side, for detecting the natural vibration of the vibrator.

In general, a tire hub for a driving tire wheel and that for a driven tire wheel are different from each other in configuration. Accordingly, two attachments different in configuration are provided according to the invention, and of the two attachments, a suitable one is selected to connect the transmittter unit to the tire hub. Therefore, the transmitter unit can be standardized; that is, it can be installed on either the driving wheel hub or the driven wheel hub, which contributes to improvement of the productivity of the system.

In another system for monitoring an air pressure of a vehicle tire according to the invention, provided on the tire wheel side are first and second oscillation circuit oscillating at different frequencies, a generator operating as a power source for the first and second oscillating circuits, a trigger circuit for causing the first oscillating circuit to start oscillation when a voltage generated by the generator exceeds a predetermined value, a pressure sensor means for causing the second oscillating circuit to start oscillation when the air pressure of the vehicle tire becomes lower than a predetermined value, and a vibration producing device which is vibrated according to the oscillation frequencies of the first and second oscillating circuits, the vibration output of the vibration producing device being transmitted to a tire wheel supporting axle shaft, affected by electrical noises or by the similar systems on other vehicles. Furthermore, since the oscillation frequencies of the first and second oscillating circuits are different, the determinating operations can be achieved correctly. In the system of the invention, the circuit elements provided in the tire wheel side are energized by the generator. Therefore, the maintenance of the system of the invention can be achieved more readily than that of the conventional air pressure monitoring means.

In still another system for detecting an air pressure of a vehicle tire according to the invention, provided on the tire wheel side are a carrier oscillation circuit for producing a carrier signal having a predetermined frequency, a pressure sensor for producing a detecting signal whose level changes with the air pressure of the respective tire, a modulating circuit for changing the frequency of the carrier signal according to the level of the detection signal, and a vibration producing device which is excited according to the frequency of the carrier signal, the vibration output thereof being transmitted to the vehicle body side; and provided on the vehicle body side is a receiver for detecting the natural vibration of the vibration producing device to continuously determine the air pressure of the tire.

The carrier outputted by the carrier oscillating circuit is modulated according to the air pressure of the tire detected by the pressure sensor, so that the frequency of the carrier signal corresponds to the air pressure of the tire. The vibration producing device transmits the vibration corresponding to the frequency of the carrier signal to the vehicle body side. On the vehicle body side, the decision device detects the natural vibration transmitted as described above, and determines the air pressure of the tire according to the frequency detected (i.e., the frequency of the carrier signal). Accordingly, the operation of the system is not affected by electrical noises or by the similiar systems on other vehicles. Since the frequency of the carrier signal changes continuously with the air pressure of the tire detected by the pressure sensor, the air pressure of the tire can be detected continuously.

DESCRIPTION OF THE PREFERRED EMBODIMENTS

The present invention will now be described with reference to the accompanying drawings.

Figure 1:
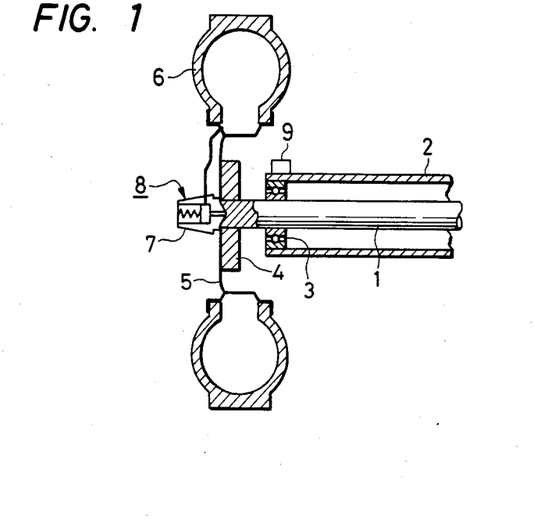
FIG. 1 is a sectional view showing essential components of a first embodiment which are arranged on a wheel of a vehicle.
Figure 2:
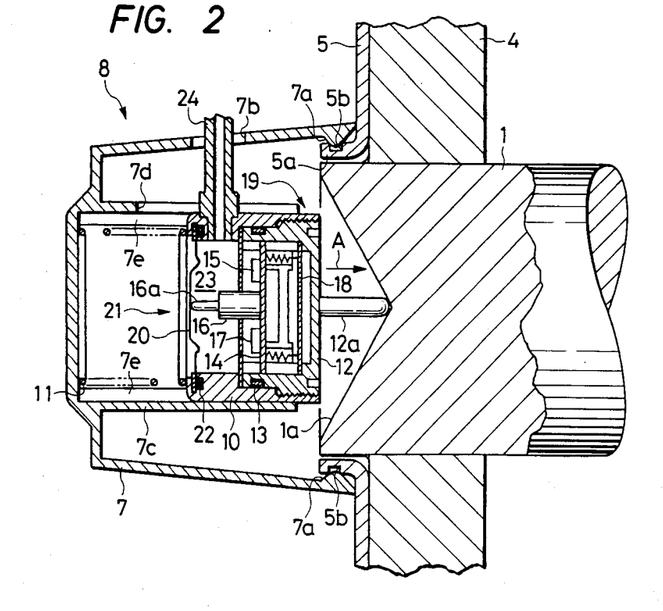
FIG. 2 is a sectional view showing essential components of the first embodiment.

FIG. 1 shows the arrangement of essential components of a tire pressure monitoring system which are provided for each of the wheels of a vehicle. In FIG. 1, reference numeral 1 designates an axle shaft; 2, an axle housing; 3, a bearing; 4, a hub; 5, a load wheel; 6, a tire; and 7, a center cap mounted on the load wheel 5 at the center. The center cap is provided with a monitoring unit 8 which is shown in FIG. 2 in detail. A pickup 9 (described later) is provided on the axle shaft side. More specifically, the pickup 9 is mounted through the axle housing 2 on the bearing 3 which is mounted on the axle shaft 1.

The monitoring unit 8 will be described with reference to FIG. 2. The center cap 7 is in the form of a bottomed plastic cylinder. The center cap 7 has a plurality of protrusions 7a which are extended inwardly from the edge of its opening, and a through-hole 7b in its side wall. The protrusions 7a are elastically engaged with a groove 5b formed in a cylindrical flange 5a of the load wheel 5, so that, the center cap 7 is detachably mounted on the load wheel. A cylindrical holding case 7c is extended from the inner surface of the bottom of the center cap 7 in such a manner that it is coaxial with the cylindrical wall of the center cap 7. The holding case 7c has a slit 7d cut in its cylindrical wall in such a manner that it is extended in the axial direction, and a pluraltiy of guides 7e formed on the inner surface of the cylindrical wall in such a manner that they also extend in the axial direction. A cylindrical holder 10 is accommodated in the holding case 7c in such a manner that it is reciprocatable in the holding case 7c while being guided by the guides 7d. A spring means such as a compression coil spring 11 is interposed between the bottom of the holding case 7c and the holder 10, thus urging the holder 10 in the direction of the arrow A (towards the axle shaft 1). A vibration transmitting member 12 is for instance threadably engaged with the inner surface of one end portion (closer to the axle shaft 1) of the holder 10. The vibration transmitting member 12 is in the form of a bottomed cylinder. A protrusion 12a extends from the bottom of the cylindrical vibration transmitting member 12 in the direction of the arrow A, so that it is pushed by the compression coil spring 11 against the deepest of a conical recess 1a which is formed in the end face of the axle shaft 1. An annular packing 13 is airtightly interposed between the holder 10 and the vibration transmitting member 12.

Figure 3:
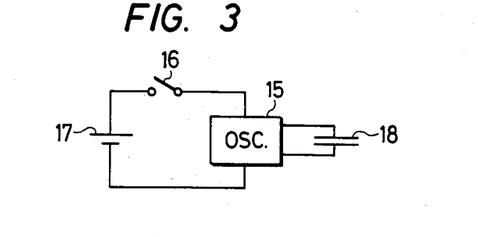
FIG. 3 is a circuit diagram showing a pressure switch and a vibration producing device in the first embodiment.

A wiring board 14 is provided in the vibration transmitting member 12. An oscillator 15, a push switch 16, and a battery 17 are installed on the wiring board 14. A piezo-electric element 18 is provided in the vibration transmitting member 12 in such a manner that it is mechanically coupled to the latter 12. The piezo-electric element 18 together with the vibration transmitting member 12 and the oscillator 15 form a vibration producing device. The oscillator 15, the push switch 16, the battery 17 and the piezo-electric element 18 are connected as shown in FIG. 3. When the push switch 16 is turned on, the oscillator 15 is energized by the battery 17, thus exciting the piezo-electric element 18. As a result, the piezo-electric element 18 vibrates at its natural frequency. The vibration of the piezo-electric element 18 is transmitted through the vibration transmitting member 12 to the axle shaft 1.

A diaphragm 20 is air-tightly mounted through an annular packing 22 on the inner surface of the other end portion of the holder 10, so that a pressure chamber 23 is formed inside the holder 10. The diaphragm 20 and the push switch 16 form a pressure switch 21. A flexible air hose 24 is inserted into the center cap 7. More specifically, one end portion of the air hose 24 is connected to the valve (not shown) of the tire 6, and the other end portion is connected to the pressure chamber 23 through the through-hole 7b of the center cap 7 and the slit 7d of the holding case 7c. In the pressure switch 21, the diaphragm 20 is moved according to the air pressure of the tire 6. When the air pressure of the tire 6 becomes lower than a value which is determined by the elastic force of the diaphragm 20, etc., the latter 20 depresses the actuator 16a of the push switch 16 to turn on the latter 16.

Figure 4:
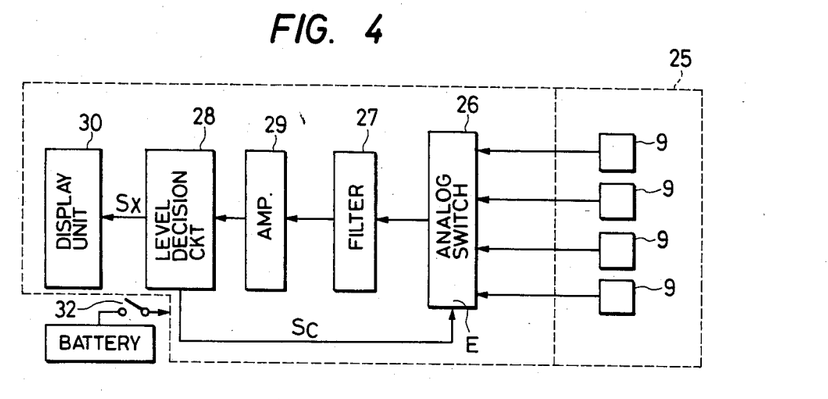
FIG. 4 is a block diagram showing the electrical arrangement of vibration detecting device in the first embodiment.

FIG. 4 shows the arrangement of circuit elements of a vibration detecting device 25 which is provided on the vehicle body side. The pickups 9 provided respectively for the four wheels of the vehicle operate to convert vibrations applied thereto (i.e., the vibrations of the respective axle shaft 1) into electrical frequency signals. The electrical frequency signals are applied to an analog switch 26. The analog switch 26 is so designed as to transmit one of the input signals. More specifically, the analog switch 26 is so designed as to successively transmit the output frequency signals of the pickups 9 according to a scanning signal Sc applied to its select terminal E. An output signal of the analog switch 26 is applied to a band-pass filter which is so designed as to transmit only the frequency signal which corresponds to the natural frequency provided by the vibration producing device 19. An output of the band-pass filter 27 is applied through an amplifier 29 to a level decision circuit 28. The level decision circuit 28 operates to output the aforementioned scanning signal Sc so as to receive the output frequency signals of the pickups 9 in time-series manner thereby to determined which of the pickups 9 has produced which of the frquency signals, and to output a detection signal Sx when the level of any one of the inputted frequency signals is higher than a predetermined value. The detection signal Sx thus outputted includes data for locating the pickup 9 which has outputted the frequency signal causing the decision circuit 28 to output the detection signal Sx (and accordingly the tire 6 whose air pressure has been decreased). The detection signal Sx is applied to a display unit 30 which is provided for instance on the instrument board of the vehicle. In response to the detection signal Sx, the display unit 30 displays the fact that the air pressure of the tire 60 is lower than the predetermined value, together with the location of the tire 6. Further in FIG. 4, reference numeral 31 designates a power source, and 32 a power switch.

In the tire pressure monitoring system thus organized, when the air pressure of any one of the tires 6 decreases, the pressure in the pressure chamber 23 decreases because the chamber 23 is communicated through the air hose 24 with the tire 6. When the air pressure of the tire becomes lower than the predetermined value, the diaphragm 6 is moved to turn on the push switch 16. As a result, the voltage of the battery 17 is applied to the oscillator 15, and the piezo-electric element 18 is vibrated at its natural frequency. The vibration of the piezo-electric element 18 is transmitted through the vibration transmitting member 12 to the axle shaft 1. The vibration is further transmitted through the bearing 3 and the axle housing 2 to the pickup 9, where it is converted into the frequency signal. The frequency signal, being scanned by the analog switch 26, is supplied to the filter 27, where noise vibration components are removed from the frequency signal. The output of the filter 27 is supplied through the amplifier 29 to the level decision circuit 28. As a result, the level decision circuit 28 outputs the detection signal Sx. In response to the detection signal Sx, the display unit 30 displays the fact that the air pressure of the tire 6 is lower than the predetermined value, together with the location of the tire 6.

The above-described display is carried out for all of the four wheel tires 6 of the vehicle. Therefore, even during traveling of the vehicle the air pressures of the tires 6 can be monitored with the display unit 30 installed inside the vehicle, In the conventional air pressure monitoring system, the radio wave signal is utilized to transmit the data that the air pressure of the tire has become lower than the predetermined value, as was described before. On the other hand, in the system of the invention, the same effect is obtained by transmitting the mechanical natural vibration to the axle shaft 1. Therefore, the system of the invention is not affected by the similar systems installed on other vehicles at all; that is, the system of the invention is considerably high in reliability. Furthermore, in the air pressure monitoring system of the invention, unlike the conventional one, it is unnecessary to use the expensive transmitter and receiver; that is, the arrangement is simple, which contributes to reduction of the manufacturing cost.

Provided on the tire side are only the monitoring unit 8 comprising the vibration producing device 19 and the pressure switch 21 arranged inside the center cap 7, and the air hose 24. Therefore, for installation of the air pressure monitoring system of the invention, it is scarcely necessary to modify the motor vehicle. This will also contribute to the cost reduction. Since the monitoring unit 8 is detachably mounted on the load wheel as was described, the maintenance such as replacement of the battery 17 or repair can be readily achieved.

In the above-described embodiment, the monitoring unit 8 is provided for each of the four wheels. However, the monitoring units 8 may be provided only for the steering tire wheels.

According to the pneumatic tire monitoring system of the invention, the pressures of the tires can be detected even during traveling of the vehicle,. Furthermore, in the system, transmission of the data on the air pressures detected is achieved by transmitting the mechanical natural vibration of the piezo-electric element through the axle shafts. Therefore, the system is never affected by electrical noises or by the similar systems on other vehicles; that is, the system is high in reliability. In addition, the system of the invention is simple in construction and can be manufactured at low cost.

Another embodiment of this invention will be described with reference to FIGS. 5 to 8.

Figure 5:
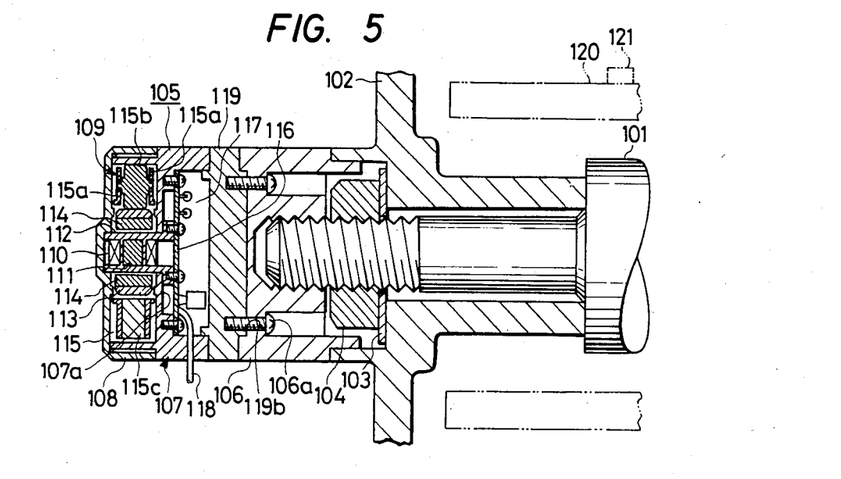
FIG. 5 is a sectional view showing essential components of a system for detecting an air pressure of a vehicle tire according to a second embodiment of the invention.

In FIG. 5, reference numeral 101 designates an axle shaft for a drive wheel of an automobile; 102 a tire hub fixedly mounted on the end portion of the axle shaft 101 with a washer 103 and a nut 104; 105, a transmitter unit; and 106, a first attachment through which the transmitter unit 105 is coupled to the tire hub 102. These components will be described with reference also to FIG. 6.

Figure 6:
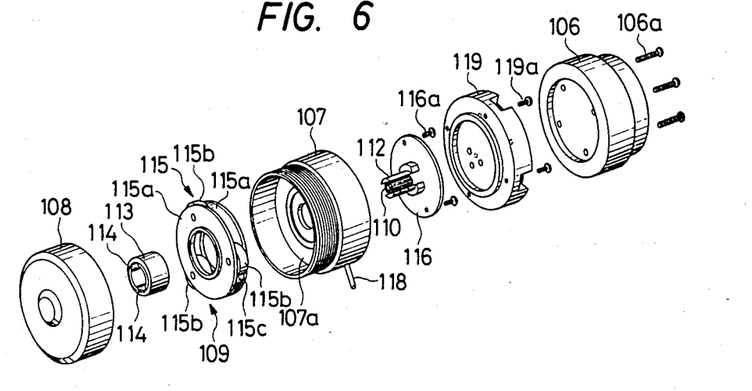
FIG. 6 is an exploded perspective view of a transmitter unit and a first attachment in the system shown in FIG. 5.

In FIGS. 5 and 6, reference numeral 107 designates a cylindrical case having a partition wall 107a inside it; 108, a cap threadably engaged with one end portion of the cylindrical case 107; and 109, a power source device such as generator, disposed between the partition wall 107a of the case 107 and the cap 108.

The generator 109 comprises: a bobbin 112; a coil 110 wound on the bobbin 112; a stator core 111 accommodated in the bobbin 112; a cylindrical rotor core 112 rotatably provided around the bobbin 112; a pair of permanent magnets 114 secured to the inner wall of the rotor core 113; and an annular rotor supporting device 115 disposed in such a manner as to surround the rotor 113. The rotor supporting device 115 comprises: a pair of annular plates 115a; three rollers 115b arranged at equal angular intervals and rotatably supported between the annular plates 115a; and a weight 15c supported between the annular plates 115a. More specifically, the rollers 115b are disposed in such a manner that the peripheral portions of the rollers 115b are partially protruded out of the inner and outer peripheries of the annular plates 115a and are in contact with the inner wall of the cylindrical case 107 and the outer wall of the rotor core 113. Therefore, the rotor core 113 is rotatably supported on the inner wall of the rotor supporting device 115. The rotor supporting device 115 is rotatably supported in the cylindrical case 107, and is held substantially at rest with the weight 115c at the bottom. More specifically, the rotor supporting device 115 is maintained substantially at rest by the rotation of the rollers 115b caused when the case 107 is rotated around the axis and by the action of the weight 115c.

When the rollers 115a are rotated as was described above, the rotor core 113 is rotated by the rollers 115b in a direction opposite to the direction of rotation of the case 107, and therefore the relative speed of the rotor core 113 and the case 107 is about twice the speed of rotation of the case 107.

The coil 110 is rotated together with the case 107. Therefore, when the case 107 is rotated around the axis, the permanent magnets 114 are turned around the coil 110, so that AC voltage is induced across the coil 110.

In FIG. 5, reference numeral 116 designates a printed circuit board fixedly supported with screws 116a inside the other end portion of the cylindrical case 107. An oscillating circuit 117, which is energized by the aforementioned generator 109, is provided on the printed circuit board. The oscillating circuit 117 receives the output of a tire air pressure detecting pressure sensor (not shown) through a lead wire 118, and starts oscillation when a predetermined air pressure is detected (or the air pressure detected is lower than a predetermined value).

The output of the oscillating circuit 117 excites a disc-shaped piezo-electric vibrator 119. The vibrator 119 is threadably mounted on the base end of the case 107 in a manner as to close the case 107 at the base end.

The case 107, the cap 108, the generator 109, the oscillating circuit 117, and the vibrator 119 form the aforementioned transmitter unit 15. The transmitter unit 105 is mounted using the vibrator 119 having a plurality of mounting holes 119b.

As was described before, the first attachment 106 is used to connect the transmitter unit 105 to the tire hub 102. The first attachment 106 is screwed on the end portion of the axle shaft 101 until it is fixedly secured to the axle shaft 101 and its periphery is abutted against the tire hub 102. The transmitter unit 105 is fixedly mounted on the first attachment 106 with the screws 106a inserted into the mounting holes 119a before the first attachment 106 is engaged with the axle shaft 101. Therefore, when the vibrator 119 is excited, its natural vibration is transmitted through the first attachment 106 and the tire hub 102 to the vehicle body side.

On the other hand, piezo-electric pickup 121 for detecting the natural vibration through a bearing (not shown) and an axle housing 120 is provided on the axle shaft side. Therefore, data on the air pressure of the tire (not shown) can be obtained from the detection output of the pickup 121.

Figures 7, 8, 9:
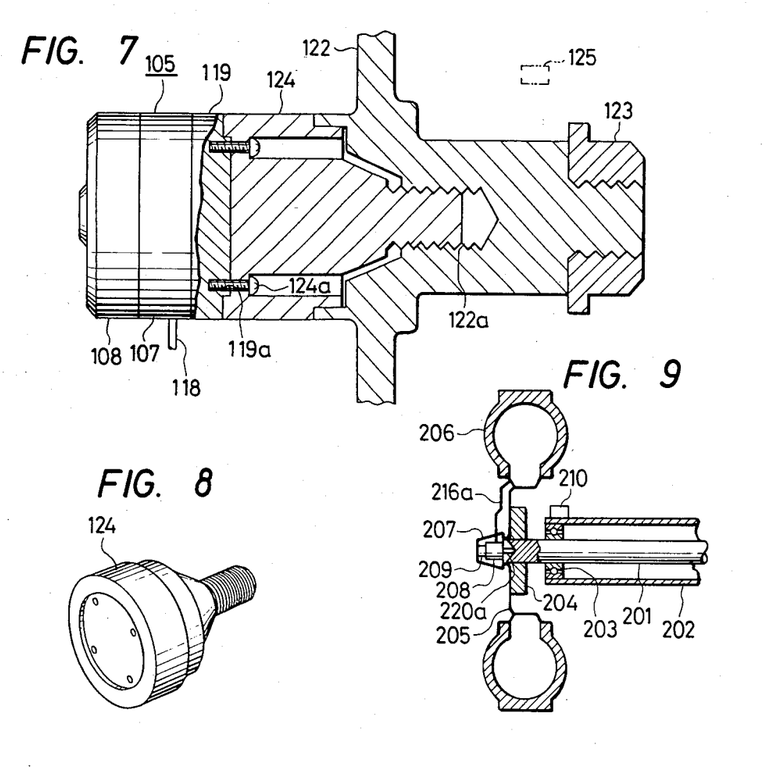
FIG. 7 is a sectional view showing a second attachment and a tire hub which are different from those in FIG. 5.
FIG. 8 is a perspective view of the second attachment.
FIG. 9 is a sectional view showing one of the tire wheels and its relevant components according to a third embodiment.

In FIG. 7, reference numeral 12 designates a tire hub for a driven wheel which is different in configuration from the aforementioned tire hub 102. The tire hub 122 is rotatably supported by a bearing (not shown), and its axial movement is prevent by a nut 123. The tire hub 122 is coupled through a second attachment 124 shown in FIG. 8 to the aforementioed transmitter unit 105. The second attachment 124 is screwed into a threaded hole 122a formed in the tire hub 122 along the axis until it is fixedly secured to the tire hub 122 and its peiphery is abutted against the tire hub 122. the transmitter unit 101 is fixedly mounted on the second attachment 124 with screws 124a inserted into the mounting threaded holes 119a before the second attachment 124 is engaged with the tire hub 122. Therefore, when the vibrator 119 of the transmitter unit 105 is excited, its natural vibration is transmitted through the second attachment 124 and the tire hub 122 to the vehicle body side.

On the vehicle body side, a vibration detecting device, namely, a piezo-electric pickup 125 for detecting the natural vibration through a bearing (not shown), etc. is provided as shown in FIG. 7. Therefore, data on the air pressure of the tire (not shown) mounted on the tire hub 122 can be obtained from the detection ouput of the pickup 125.

As was described above also in the embodiment of FIGS. 4 to 8, data on the air pressures of tires of a vehicle can be transmitted to the vehicle body side even during traveling. Therefore, if the air pressures of the tires are displayed or indicated in the operator's room, then the tires can be prevented from increasing their temperatures.

In the system of FIGS. 4 to 8, unlike the prior art system using the radio wave signals for transmission of the data on the air pressures of the tires, the transmission of the data on the air pressures of the tires is achieved by utilization of the mechanical natural vibration transmitted through the tire hub 102 or 122. Therefore, the operation of the system of the invention is never adversely affected by electrical noises or by the similar systems on other vehicles. In addition, in the system of FIGS. 4 to 8, the generator 109 is used as a power source for the transmitter unit 105. Therefore, the system is free from the difficulty that the maintenance is rather troublesome in the system using the battery.

In the system of the invention, the generator 109, the oscillating circuit 117, the vibrator 119, etc. are formed into one unit, i.e., the transmitter unit 105, and therfore they can be readily mounted on the tire hub.

Furthermore, according to the invention, the first attachment 106 and the second attachment 124 are provided for the tire hubs 102 and 122 diferent in configuration, respectively, so that one and the same transmitter unit 105 can be connected to the different tire hubs 102 and 122; that is, the transmitter unit 105 can be standardized. This contributes to improvement of the productivity of the system and accordingly reduction of the manufacturing cost, and results in a decrease of the maintenance cost in the market.

Still another embodiment of this invention will be described with reference to FIGS. 9 to 13.

Figure 10:
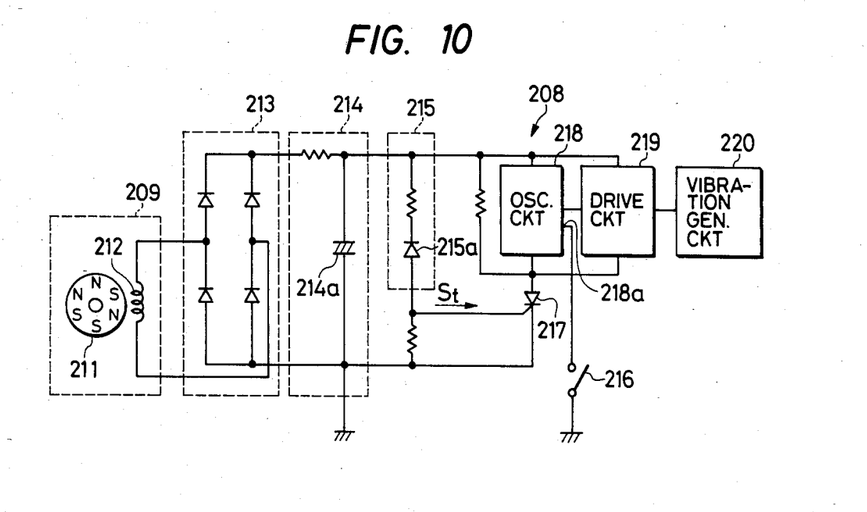
FIG. 10 is a circuit diagram showing circuit elements provided for each of the tire wheels according to the third embodiment.

The arrangement of one vehicle tire, to which the technical concept of this embodiment is applied, is as shown in FIG. 9. In FIG. 9 reference numeral 201 designates an axle shaft; 202, an axle housing; 203, a bearing, 204, a hub; 205, a tire wheel; and 206, a tire. A center cap 207 is mounted on the tire wheel 205 at the center. A monitoring unit 208 and a generator 209, whose circuits are as shown in FIG. 10, are provided inside the center cap 207. A pickup 210 for detecting vibration is provided on the axle shaft side, for instance on the axle housing 202 near the bearing 203.

Now, the electrical circuit of FIG. 10 will be described. The aforementioned generator 209 is made up of an annular permanent magnet of multi-pole type 211 and a coil 212 for instance. The permancent magnet 211 is rotatably supported at the center by the side wall (corresponding to the bottom ) of the center cap 207, and has a weight (not whown) on the periphery so that, when the tire wheel 205 is rotated, the permanent magnet 211 is held substantially at rest by inertia, that is, the permanent magnet is so provided as to rotate relative to the tire wheel 205. The coil 212 is fixedly installed in such a manner as to confrong the permanent magnet 211 in the center cap 207. Therefore, when the wheel 205 is rotated, the coil is rotated relative to the permanent magnet 211 to produce an electromotive force. In other words, the generator 209 is so designed as to generate electric power as the tire wheel is rotated. The electric power thus generated is applied to the monitoring unit 208.

The monitoring unit 208 comrpises a rectifier circuit 213, a battery circuit 214, a trigger circuit 215, pressure sensor means such as a pressure switch 216, a thyristor 217, oscillating circuit means 218, a drive circuit 219, and vibration producing means such as a piezo-electric element 220. The electric power developed across the coil 212 is subjected to full-wave rectification by the rectifier circuit 213, and a capacitor 214a in the battery circuit 214 is charged by the output of the rectifier circuit 213. the trigger circuit 215 comprises a constant voltage diode 215a. When the voltage Vc of the capacitor 214a thus charged exceeds a predetermined upper value that is the Zener voltage Vz of the constant voltage diode 215a, a trigger signal St is outputted in response to the breakover of the diode 215a. The trigger signal St is applied to the thyristor 217 to turn on the latter 217, so that the ouput of the battery circuit 214 is supplied, as power source, to the oscillating circuit means 218 and th edrive circuit 219.

The pressure switch 216 is used to detect the air pressure of the tire 206 through a pipe 216a shown in FIG. 9. The pressure switch 216 is turned on when the air pressure becomes lower than a predetermined value. The pressure switch 216 is connected between an input terminal 218a of the oscillating circuit means 218 and a ground terminal. When the pressure switch 216 is turned on, a lower level signal is applied to the input terminal 218a; and when the switch 216 is turned off, a high level signal is applied to the input terminal 218a.

The drive circuit 219 receives the oscillation output of the oscillating circuit means 218 to cause the piezoelectric element 220 to vibrate according to the oscillation frequency of the oscillating circuit menas 218. The vibration output of the piezo-electric element 220 is transmitted through a vibration transmitting member (220a in FIG. 9) to the axle shaft 201.

Figure 11:
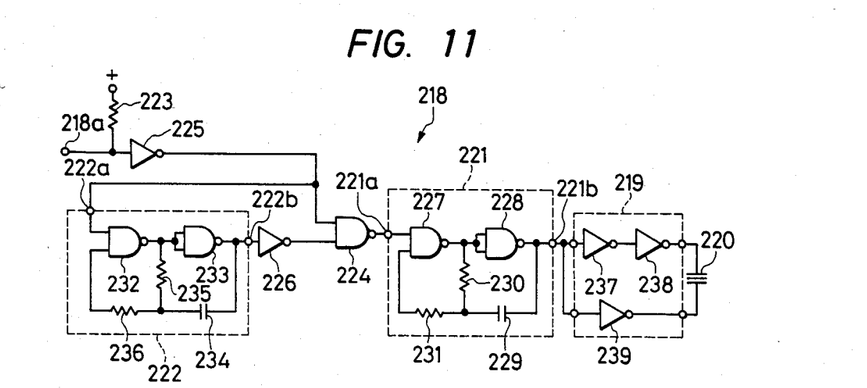
FIG. 11 is a circuit diagram of an oscillating circuit means shown in FIG. 10.

The oscillating circuit means 218 and the drive circuit 219 are shown in FIG. 11 in more detail. The oscillating circuit means 218 comprises a first oscillating circuit 221, a second oscillating circuit 222, a pull-up resistor 223, a NAND circuit 224, and inverters 225 and 226. The first oscillating circuit 211 is a conventional one comprising a control input terminal 211a, an output terminal 211b, NAND circuits 3227 and 228, a capacitor 229 and a resistor 230 forming a time constant circuit, and a protective resistor 231 which are connected as shown in FIG. 11. That is, the first oscillating circuit 211 is so designed that it oscillates at a relatively high frequency $f_1$ when a high level signal is applied to the control input terminal 211a. The second oscillating circuit 222 is also a conventional one comprising a control input terminal 222a, an output terminal 222b, NAND circuits 232 and 233, a capacitor 234 and a resistor 235 forming a time constant circuit, and a protective resistor 236 which are connected as shown in FIG. 11. That is, the second oscillating circuit 222 is so designed that it oscillates at a relatively low frequency $f_2$ ($f_2 < f_1$) when a high level signal is applied to the control input terminal 222a.

the inverter 225 is adapted to invert the input signal applied to the input gterminal 218a of the oscillating circuit means 218. The output of the inverter 225 is applied to the control input terminal 222a of the second oscillating circuit 222 and to one input terminal of the NAND circuit 224. the other inverter 226 is adapted to invert the output of the second oscillating circuit 222. the output of the inverter 226 is applied to the other input terminal of the NAND circuit 224. The output of the NAND circuit 224 is supplied to the control input terminal 221a of the first oscillating circuit 221.

The drive circuit 219 comprises inverters 237, 238 and 239 which are connected as shown in FIG. 11. The drive circuit 219 receives the output of the first oscillating circuit 221 to excite the piezo-electric element 220.

Figure 12:
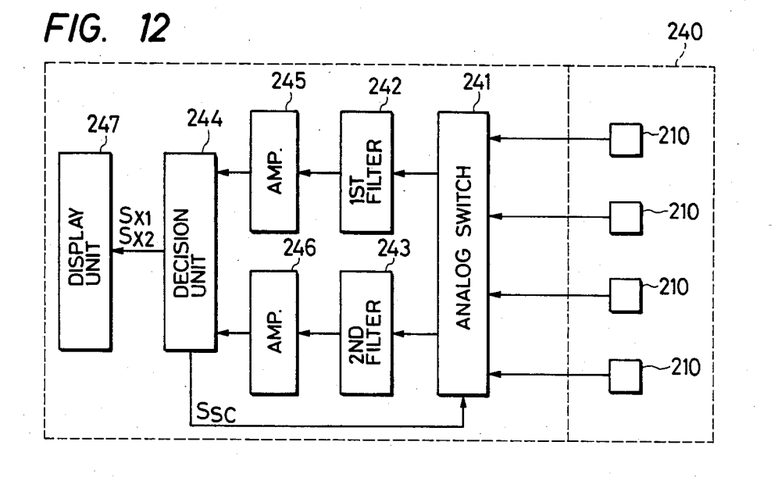
FIG. 12 is a block diagram of the vibration detecting device according to the third embodiment.

FIG. 12 shows one example of the circuit of a vibration detecting device 240 which is provided on the vehicle body. The pickups 210 installed on the four wheels of the vehicle operate to convert vibrations transmitted thereto (i.e., vibrations of the axle shafts) into electrical frequency signals, which are applied to an analog switch 241. the analog switch 241 is so designed as to transmit one of the input signals. In other words, the analog switch 241 is so designed as to sequentially transmit the output frequency signals of the pickups 210 according to a scanning signal Ssc applied to a select terminal E of the analog switch 241. The vibration detecting device 240 further comprises first and second band-pass filters 242 and 243 which receive the output signals of the analog switch 241. The first band-pass filter 242 is so designed as to transmit only the frequency signal corresponding to the oscillation frequency $f_1$ of the first oscillating circuit 221, while the second band-pass filter 243 is so designed as to transmit only the frequency signal corresponding to the oscillation frequency $f_2$ of the second oscillating circuit 222.

The outputs of the band-pass filters 242 and 243 are supplied respectively through amplifiers 245 and 246 to a decision circuit 244. The decision circuit 244 outputs the aforementioned scanning signal Ssc to receive the output frequency signals of the pickups 210 in time-series manner thereby to determine which of the pickups 210 in time-series manner thereby to determine which of the pickups 210 has produced which of the frequency signals. Furthermore, the decision circuit 244 outputs a first detection signal $Sx_1$ when the application of the frequency signal (corresponding to the oscillation frequency $f_1$ of the first oscillating circuit 221) through the filter 242 has been suspended for a predetermined period of time, and a second detection signal $Sx_2$ when its receives the frequency signal (corresponding to the oscillation frequency $f_2$ of the second oscillating circuit 222) through the filter 243. the detection signals $Sx_1$ and $Sx_2$ contain data with which the pickups can be detected which have outputted the frequency signals, resulting in the production of the detection signals $Sx_1$ and $Sx_2$.

Further in FIG. 12, reference numeral 247 designates a display unit 247 installed, for instance, on the instrument borad of the vehicle, The display unit 247 receives the above-described first and second detection signals $Sx_1$ and $Sx_2$. Upon reception of the first detection signal $Sx_1$, the display unit 247 displays the fact that one of the monitoring units 208 or generators 209 is in abnormal state, together with the position of the ture 206 concerning the monitoring unit generator 209. Upon reception of the second detection signal $Sx_2$, the display unit 247 displays the fact that the air pressure in one of the tires 206 becomes lower than the predetermined value, together with the position of the tire 206.

The above-described vibration detecting device 240 is activated only when the traveling of the vehicle is detected by a vehicle speed sensor (not shown).

Figure 13:
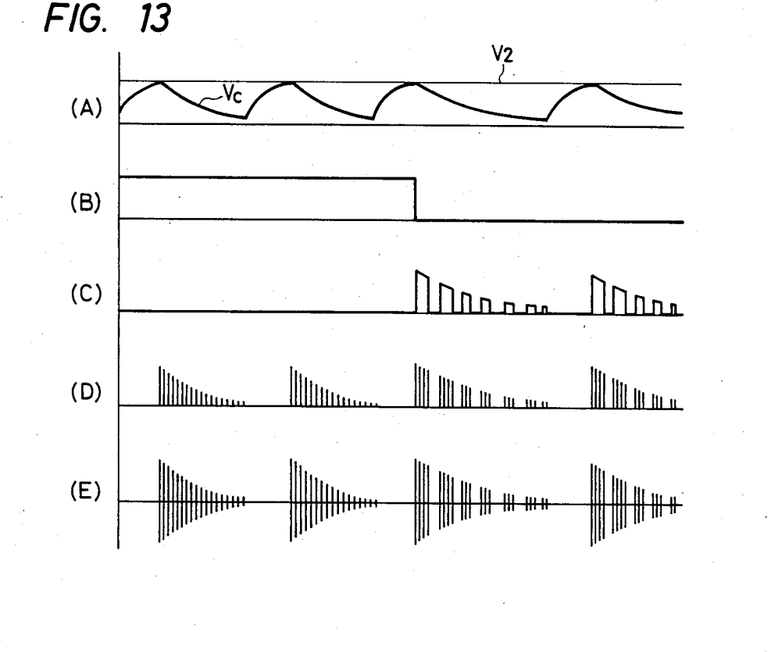
FIG. 13 is a time chart for the operation of the third embodiment of the invention.

The operation of the air pressure monitoring system thus organizaed will be described with reference to FIG. 13. In FIG. 13, the part (A) shows the charging voltage Vc of the capacitor 214a, the part (B) the input voltage applied to the input terminal 218a of the oscillating circuit means 218, the part (C) the output voltage of the second oscillating circuit 222, the part (D) the output voltage of the first oscillating circuit 221, and the part (E) the exciting voltage for the piezo-electric element 220.

When the vehicle starts, the vibration detecting device 240 is activated, and each of the generators 209 generates electric power, so that the charging voltage Vc of the capacitor 214a is gradually increased. When the voltage Vc exceeds the Zener voltage Vz of the constant voltage diode 215a, the trigger circuit 215 outputs the trigger signal St, whichis applied to the thyristor 217 to turn on the same 217. As a result, the output of the battery circuit 214 is applied to the oscillating circuit means 218 and the drive circuit 219. If, in this case, the air pressure of the tire 206 is in a normal range, the pressure switch 216 is maintained turned off, so that the high level signal is applied to the input terminal 218a of the oscillating circuit means 218. Therefore, in the oscillating circuit means 218, the inverter 225 outputs the low level signal. The output high level signal of the NAND circuit 224 being applied to the control input terminal 221a, the first oscillating circuit starts oscillation. On theother hand, the output low level signal of the inverter 225 beng applied to thecontrol input terminal 222a, the second oscillating circuit 222 is maintained stopped. As a result, the first oscillating circuit 221 outputs theoscillationsignal having the frequency $f_1$ (cf. the part (D) of FIG. 13), which is applied to the drive circuit 219. Therefore, the drive circuit 219 excites the piezo-electric element 220 at the frequency $f_1$, and the natural vibration of the latter 220 is transmitted through the vibration transmitting member 220a to the axle shaft 201. The natural vibration of the piezo-electric element 220 is further transmitted through the bearing 203, and the axle housing 202 to the pickup 210, where it is converted into a frequency signal. The frequency signal, being scanned by the analog switch 240, is applied to the band-pass filter 242, where noise vibration components are removed from the frequency signal. The output signal of the band-pass filter 242 is applied through the amplifier 245 to the decision circuit 244.

As the first oscillatio circuit 221 operates, as described above, consuming the electric power, thevoltage Vc of the capacitor 214a is gradually decreased, so that the thyristor 217 is turned off. As a result, the oscillation of the first oscillating circuit 221 is suspended. Therefore, the voltage Vc of the capacitor 214a is raised again, and th thyristor 217 is turned on. The above-described operatios are repeatedly carried out, so that the first osciallating circuit 221 outputs the oscillation signal intermittently. If, in this case, the generator 209 and the oscillating circuits 221 and 222 and the piezo-electric element 220 in the monitoring unit 208 are operating normally, intermittently ootputting of the oscillation signal and accordingly the frequency signal through theband-pass filter 242 is continued, and therefore the decision circuit 244 will not output the first detection signal $Sx_1$. On the other hand, if the generator 209, or the whole or part of the monitoring unit 208 is in abnormal state (for instance the generator 209 is out of order), thestate that the oscillationsignal is not outputted by the first oscillating circuit 221 and accordingly the frequency signal is not provided through the band-pass filter 242 will be continued for more than a predetermined period of time, and therefore the decision circuit 244 will output the first detection signal $Sx_1$. The first detection signal $Sx_1$ thus outputted being applied to the display unit 247, the latter 247 displays the fact that the monitoring unit 208 or the generator 209 is out of order, together with the position of the tire concerning the monitoring unit 208 or the generator 209.

When the air pressure of the tire 206 becomes lower than the predetermined value, the pressure switch 216 is turned on, so that thelow level signal is applied to the input terminal 218a of the oscillating circuit means 218. therefore, in the oscillating circuit means 218, the inverter 225 outputs a high level signal, which is applied to the control input terminal 222a of the second oscillating circuit 222. Thus, similarly as in the above-described first oscillating circuit 221, the second oscillating circuit 222 oscillates periodically in synchronization with the periodic turn-on operation of the thyristor 217, so that an oscillation signal having the oscillation frequency $f_2$ is outputted by the second oscillating circuit 222 (cf. the part (C) of FIG. 13). The oscillationsignal thus outputted is applied through the inverter 226 and the NAND circuit 224 to the control input terminal 221a of the first oscillating circuit 221. Accordingly, the first oscillating circuit 221 is allowed to oscillate only for the period of time when the oscillatiosignal of the second oscillating circuit 222 rises; that is, the apparent frequency of the oscillation signal of the first oscillating circuit is $f_2$. The oscillation signal of the first oscillating circuit is applied to the drive circuit 219, so that the piezo-electric element 220 is excited at the frequency $f_2$ by the drive circuit 219.

The natural vibration of the piezo-electric element 220 thus excited is transmitted through the vibration transmitting member 220a, the axle shaft 201, etc. to the pickup 210, where it is converted into a frequency signal. The frequency signal, being scanned by the analog switch 241, is applied to the band-pass filter 243, where noise vibration components are removed from the frequency signal. The output of the filter 243 is applied through the amplifier 246 to thedecision circuit 244. As a result, the decision circuit 244 outputs the second detection signal $Sx_2$, which is applied to the display unit 247. Thereupon, the display unit 247 displays the fact that the air pressure of the tire 206 is lower than the predetermined value, together with the location of the tire 206.

The above-described operations are carried out for each of the four wheels of the vehicle. Therefore, even during traveling, it can be monitored whether or not the air pressures of thefour tires 206 are in the allowable range, and whether or not the air pressure detecting means are operating correctly. As was described bove, in the air pressure monitoring system of the invention, transmission of the data signal as to whether or not the tire air pressure is in theallowable range ad wheterh or not the air pressure detecting means is operating correctly is achieved by transmitting the mechanical natural vibration to the axle shaft 201.

In this embodiment, the pickups 210 provided on the side of the axlw shafts 201 receive the data signals from the respective tires 206. Therefore, even when, after the tires 206 have been relocated for "tire rotation", the air pressure of any one of the tires 206 becomes lower than the predetermined value, the display unit 247 can positively display the location of that tire 206. Accordingly, in the system of the invention, unlike the conventional system, it is unnecessary to change the coded signals assigned to the tires whenever the tires are relocated. Thus, the system of the invention is more practical.

In the above-described embodiment, the monitoring units 208 are provided for all of the four wheels. However, the tire pressure monitoring system of the invention may be so modified that the monitoring units 208 are provided for only the wheels steered.

Still another embodiment of this invention will be described with reference to FIGS. 14 to 17. This embodiment is similar to the embodiment shown in FIGS. 9 ato 13. In these embodiment the same reference numerals are used to designate the same members or components.

Figure 14:
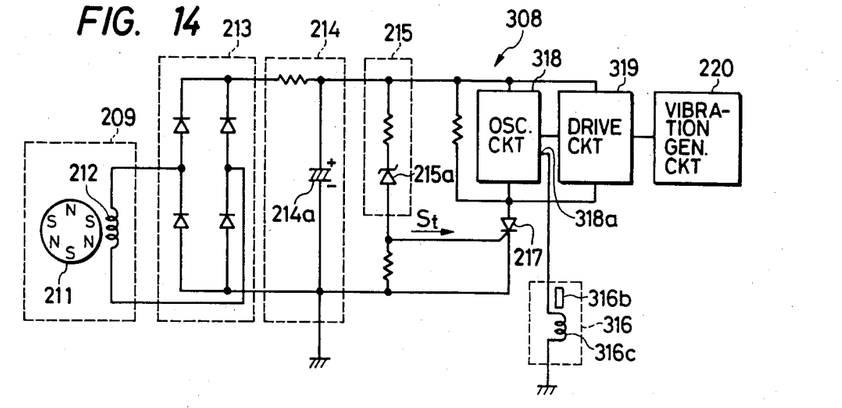
FIG. 14 is a circuit diagram of a vibration detecting unit in accordance with a fourth embodiment.

A detecting unit 208 comprises a genertor 209, a rectifier circuit 213, a charging circuit 214, a trigger circuit 215, a pressure sensor 216, a thyristor 217, an oscillating circuit means 318, a drive circuit 219, and a vibration producing device, namely, a piezo-electric element 220.

A pressure sensor 316 is sued to detect the air pressure of the tire through a pipe. The pressure sensor 316 comprises: a core 316b which is displaced according to the air pressure detected; and a detecting coil 316c whose inductance is changed according to the displacement of the core 316b. That is, the inductance of the detecting coil 316c is varied with the air pressure of the tire. The variation of the inductance is utilized as a detection signal in the invention. The detecting coil 316c of the pressure sensor 316 is connected between an input terminal 318a of the oscillating circuit means 318 and a ground terminal.

The drive circuit 319 receives the oscillation output of the oscillating circuit means 318 to cause the piezo-electric element 220 to vibrate according to the oscillating frequency of the oscillating circuit means 318. The vibration output of the piezo-electric element 220 is transmitted through a vibration transmitting member to the axle shaft.

Figure 15:
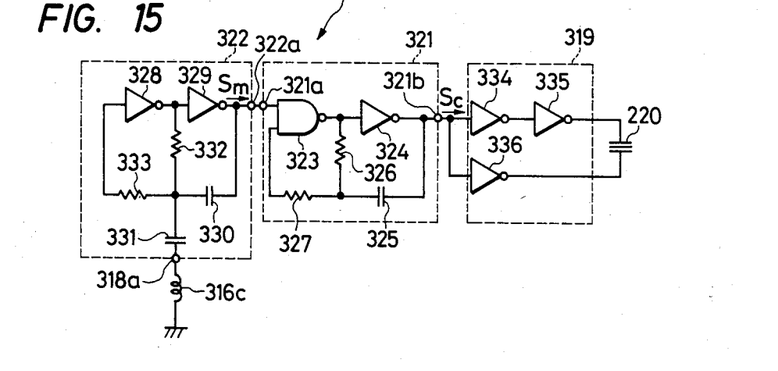
FIG. 15 is a circuit diagram of an oscillating circuit means in accordance with the fourth embodiment.

The oscillating circuit means 318 and the drive circuit 319 are shown in FIG. 15 in more detail. The oscillating circuit means 318 comprises a carrier oscillating circuit 321, and a modulating circuit 322. The carrier oscillatng circuit 321 comprises a control input terminal 321a, an output terminal 321b, a NAND circuit 323, an inverter 324, a capacitor 325 and a resistor 326 forming a time constant circuit, and a protective resistor 327 which are connected as shown in FIG. 15. When an input signal applied to the control input terminal 321a is raised, the carrier oscillating circuit 321 oscillates a carrier signal Sc having a predetermined frequency. The modulating circuit 322 comprises inverters 328 and 329, capacitors 330 and 331, and resistors 332 and 333 which are connected between the input terminal 318a and an output terminal 222a as shown in FIG. 11. When the thyristor 217 is turned on, the modulating circuit 322 is energized to output a modulating signal Sm having a frequency corresponding to the inductance of the detecting coil 316c. The modulating signal Sm thus outputted is applied to the control input terminal 321a of the carrier oscillating circuit 321.

The drive circuit 319 comprises three inverters 334, 335 and 336 which are connected as shown in FIG. 15. The drive circuit 319 receives the carrier signal Sc from the carrier oscillating circuit 321 to excite the piezo-electric element 220.

Figure 16:
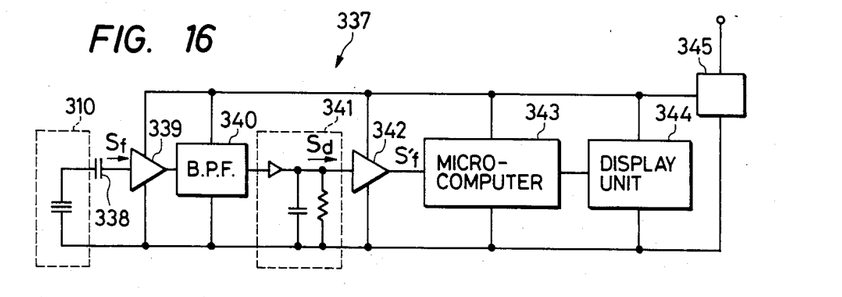
FIG. 16 is a circuit diagram of a receiver in accordance with the fourth embodiment.

FIG. 16 shows one example of a receiver 337 provided on the vehicle body side. The pickup 310 operates to convert the vibration transmitted thereto (i.e., the vibration of the axle 1) into an electrical frequency signal Sf. The electrical frequency signal Sf is applied through a capacitor 338, an amplifier 339, and a band-pass filter 340 to a detector circuit 341. The detector circuit 341 is adapted to demodulate the frequency signal Sf to obtain the carrier signal Sc, and to produce a pulse-train-like detection signal Sd having a frequency corresponding to the carrier signal Sc thus obtained. The detection signal Sd is applied to a comparator 342.

The comparator 342 is so designed as to compare the voltage level VSd of the detection signal Sd thus inputted with a reference voltage Vr, and to output a hihg level signal when $VDd > Vr$. In other words, the comparator 342 is used to subject the detection signal Sd to waveform shaping thereby to output a frequency signal S'f. the frequency signal S'f is applied, as data input, to a microcompter 343. The microcomputer 343 operates to determined the air pressure of the tire according to the frequency of the frequency signal S'f, and to display the air pressure thus determined on a display unit 344 which is installed, for instance, on the instrument board of the vehicle. Further in FIG. 16, reference numeal 345 designates a power source for the receiver 337. The receiver is activated only when the traveling of the vehicle is detected by a vehicle speed sensor (not shown). The detecting unit 308, the generator 209, and the receiver 337 are provided for each of the tires of the four wheels, or each of the tires of the wheels steered of the vehicle.

Figure 17:
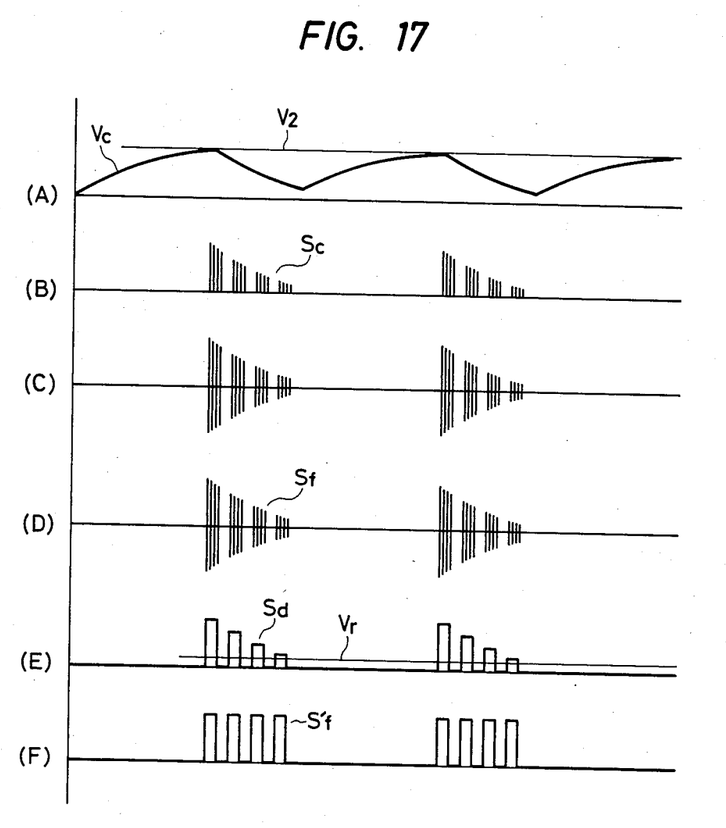
FIG. 17 is a time chart for the operation of the fourth embodiment.

The operation of the vehicle tire's air pressure detecting system thus organized will be described with reference to FIG. 17 which shows signal waveforms at various circuit points in FIGS. 14 through 16. In FIG. 17, the part (A) shows the charging voltage Vc of the capacitor 214a, the part (B) the carrier signal Sc outputted by the carrier oscillating circuit 321, the part (C) an exciting voltage for thepiezo-electric element 220, the parrt (D) the frequency signal Sf outputted by the amplifier 339, the part (E) the detection signal Sd outputted by the detector circut 341, and the part (F) the frequency signal S'f outputted by the comparator 342.

When the vehicle is started, the receiver 337 is actiavated, and the generator 209 is operated, so that the voltage Vc of the capacitor 214a is gradually increased. When the voltage Vc exceeds the Zener voltage Vz of the constant voltage diode 215a, the latter 215a breaks over, as a result of which thetrigger circuit 215 outputs the trigger signal St. The Trigger signal St turns on the thyristor 217, so that the output of the battery circuit 214 is applied to the oscillating circuit means 218 and the drive circuit 219. As a result, the modulating circuit 322 starts oscillation to provide the modulating signal Sm, which is supplied to the control input terminal of the carrier oscillating circuit 321. Therefore, the carrier oscillating circuit 321 operates only for the period of time when the modulating signal Sm is raised, thereby to output the carrier signal Sc modulated with the modulating signal Sm. Accordingly, the apparent frequency of the carrier signal Sc corresponds to the air pressure of the tire indicated by the frequency of the modulating signal and accordingly by the inductance of the detecting coil 316c.

The carrier signal Sc is applied to the drive circuit 319, so that the latter 319 excites the piezo-electric element 220 at the frequency of the carrier signal SC. The natural vibration of the piezo-electric element 220 is transmitted through the vibration transmitting member to the axle shaft.

As the oscillating circuit means 318 and the drive circuit 319 are energized to drive thepiezo-electric element 220 as was described above, the power consumption is gradually increased, that is, the voltage Vc of the capacitor 214a is gradually decreased. As a result, the thyristor 217 is turned off, thus suspending the energizationof the oscillating circuit means 318, etec. Therefore, the voltage Vc of the capacitor 214c is increased again to turn on the thyristor 217. The above-described operation is repeatedly carried out, so that the carrier signal Sc is intermittently outputted by the carrier oscillating circuit 321.

The natural vibration of the piezo-electric element 220 transmitted to the axle shaft 1 is further transmitted through the bearing and the axle housing to thepickup 310, where it is converted into the frequency signal Sf. The frequency signal Sf is applied through the amplifier 339 to the band-pass filter 340, where noise vibration components are removed from the frequency signal Sf. The output signal of the band-pass filter 340, being detected by the detector circuit 341, is applied as the detectionsignal Sd, to the comparator 343. The comparator 343 compares the voltage VSd of the detection signal Sd with thereference voltage Vr shown in the part (E) of FIG. 17, thus outputting the frequency signal S'f waveform-shaped as shown in the part (F) of FIG. 17. The frequency signal S'f thus outputted is applied to the microcomputer 343. The frequency of the frequency signal S'f corresponding to the frequency of the carrier signal Sc and accordingly the air pressure of the tire according to the frequency signal S'f received, and displays it on the display unit 344.

In the vehicle tire's air pressure detecting system of this embodiment, even during traveling of the vehicle, the variation in air pressure of the tire is continuously detected, and the detection result is displayed on the display unit 344 installed in the operator's room; that is, the operator can confirm whether or not the air pressures of the tires are normal while running the vehicle. Since the variation of the air pressure of the tire can be continuously detected as was described above, the detection results displayed on the display unit 344 are detailed.

What is claimed is:

1. A system for monitoring air pressure of a vehicle tire which comprises:
   a pressure switch means provided on a tire wheel side, said pressure switch means being turned on when the air pressure of the vehicle tire assigned to said pressure switch means becomes lower than a predetermined value;
   a vibration producing means for producing vibration at a predetermined natural frequency when said pressure switch means is turned on, said vibration thus produced being transmitted to an axle shaft supporting said tire wheel; and
   a vibration detecting means for detecting said vibration, said vibration detecting means being provided on the axle shaft side.

2. the system of claim 1, in which said pressure switch means and said vibration producing means are accommodated in a center cap which is centrally mounted on the tire wheel side of the vehicle.

3. The system of claim 2, in which said vibration producing means comprises a vibration transmittinng member whichis spring-biased against oe end face of said axle shaft,and a piezo-electric element for applying vibration to said vibration transmitting member.

4. The system of claim 1, in which said vibration detecting means includes a pickup installed onan axle housing of said axle shaft, said pickup adapted to convert the natural vibration transmitted to said axle shaft into an electrical frequency signal.

5. A system for monitoring air pressure of a vehicle tire, which comprises:
   a transmitter unit including a power source means, an oscillating circuit for carrying out oscillation in response to a detection signal outputted by a pressure sensor which is so arranged as to detect the air pressure of the vehicle tire, and a vibrator excited by an output of said oscillating circuit to vibrate at natural vibration;
   an attachment selected according to a configuration of a tire hub, to connect said tire hub to said transmitter unit,
   the natural vibrationof said vibrator thus excited being transmitted through said attachment and said tire hub to the vehicle body side; and
   a vibration detecting means provided on the vehicle body side, for detecting the natural vibrationof said vibrator.

6. The system of claim 5, in which said power source means includes magnets and a coil.

7. A system for monitoring air pressure of a vehicle tire which comprises:
   first and second oscillating circuits provided on a tire wheel side, oscillating at different frequencies;

a generator provided on the tire wheel side, for generating electric power with the rotation of said tire wheel, which is applied to said first and second oscillating circuits;

a trigger circuit provided on the tire wheel side, said grigger circuit causing said first oscillating circuit to start oscillation when a voltage generated by said generatr exceeds a predetermined value;

a pressure sensor means provided on the tire wheel side, said pressure sensor means causing said second oscillating circuit to start oscillation when the air pressure of said vehicle tire becomes lower than a predetermined value;

a vibration producing means provided on the tire wheel side, and vibrated according to said oscillation frequencies of said first and second oscillating circuits, an vibration output of said vibration producing means being transmitted to a wheel supporting axle shaft; and a vibration detecting means provided on the axle shaft side to detect the natural vibration of said vibration producing device thereby to determine at least the conditions of said generator and said pressure sensor means.

8. A system for detecting air pressure of a vehicle tire which comprises:

a carrier oscillating circuit provided on a tire wheel side, for producing a carrier signal having a predetermined frequency;

a pressure sensor provided on the tire wheel side, for outputting a detection signal whose level changes with the air pressure of the respective tire;

a modulating circuit provided on the tire wheel side, for changing the frequency of said carrier signal according to the level of said detection signal;

a vibration producing means provided on the tire wheel side, and vibrating according to the frequency of said carrier signal, a vibration output of said vibration producing means being transmitted to the vehicle body side; and a receiver provided on the vehicle body side, for detecting natural vibration of said vibration producing means to determine the air pressure of said tire.

* * * * *

UNITED STATES PATENT AND TRADEMARK OFFICE
CERTIFICATE OF CORRECTION

PATENT NO. : 4,742,712
DATED : May 10, 1988
INVENTOR(S) : SADAO KOKUBU

It is certified that error appears in the above-identified patent and that said Letters Patent is hereby corrected as shown below:

Claim 2, column 16, line 31, "the" should be --The--.

Claim 3, column 16, line 37, "whichis" should be --which is--.

Claim 3, column 16, line 37, "oe" should be --one--.

Claim 3, column 16, line 41, "onan" should be --on an--.

Claim 3, column 16, line 61, "vibrationof" should be --vibration of--.

Claim 7, column 17, line 8, "generatr" should be --generator--.

Signed and Sealed this

Twenty-ninth Day of November, 1988

Attest:

DONALD J. QUIGG

Attesting Officer

Commissioner of Patents and Trademarks